UNITED STATES PATENT OFFICE.

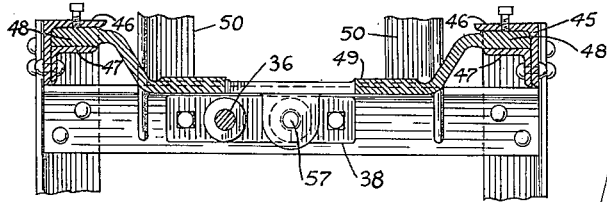
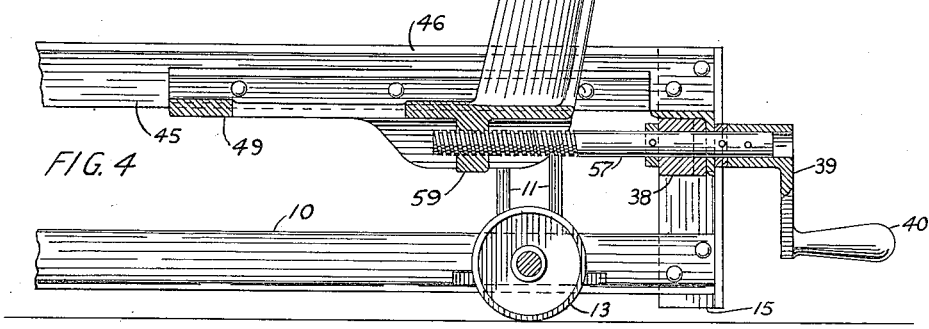
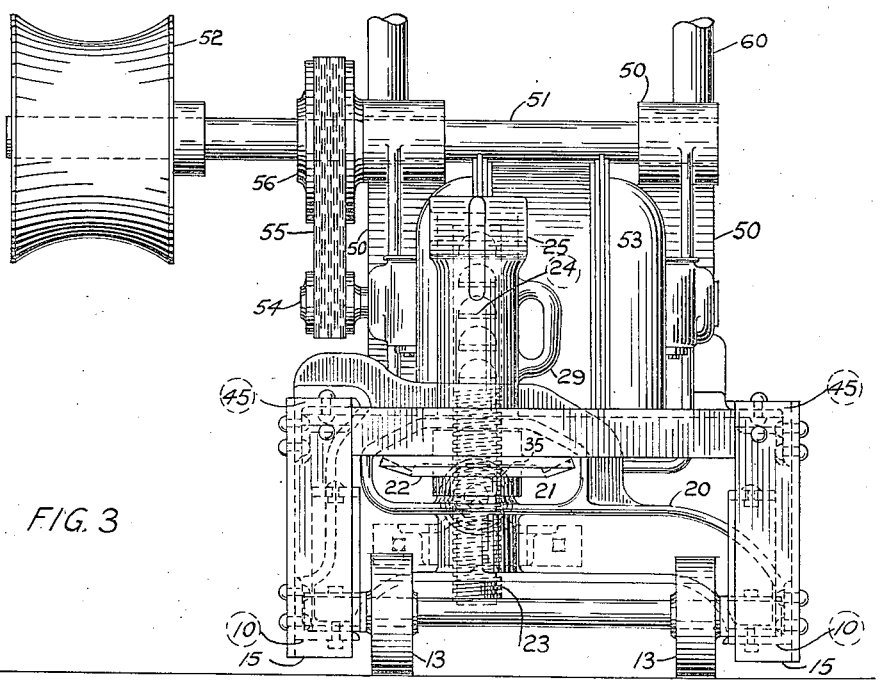

VANE B. KORNER, OF LA GRANGE, AND GUY R. TREVILLIAN, OF CICERO, ILLINOIS; SAID TREVILLIAN ASSIGNOR TO SAID KORNER.

POWER-TAKE-OFF MECHANISM.

1,368,943. Specification of Letters Patent. Patented Feb. 15, 1921.

Application filed May 3, 1920. Serial No. 378,408.

*To all whom it may concern:*

Be it known that we, VANE B. KORNER and GUY R. TREVILLIAN, both citizens of the United States, and residing at La Grange, Cook county, Illinois, and Cicero, Cook county, Illinois, respectively, have invented certain new and useful Improvements in Power-Take-Off Mechanism, of which the following is a specification.

This invention relates to a mechanism to which power may be transmitted from one of the driving wheels of a self-propelled vehicle. In the exemplification herein shown, we have shown a unitary structure wherein the power is utilized to drive a generator for supplying electric current which may be used for any desired purpose, but other desired applications of the power may, of course, be made.

Referring to the drawings which illustrate a preferred embodiment of this invention—

Fig. 3 is an end elevation;

Fig. 4 is a detail of the carriage, being a longitudinal section centrally thereof; and Fig. 5 is a transverse section of the parts shown in Fig. 4.

Figure 1:
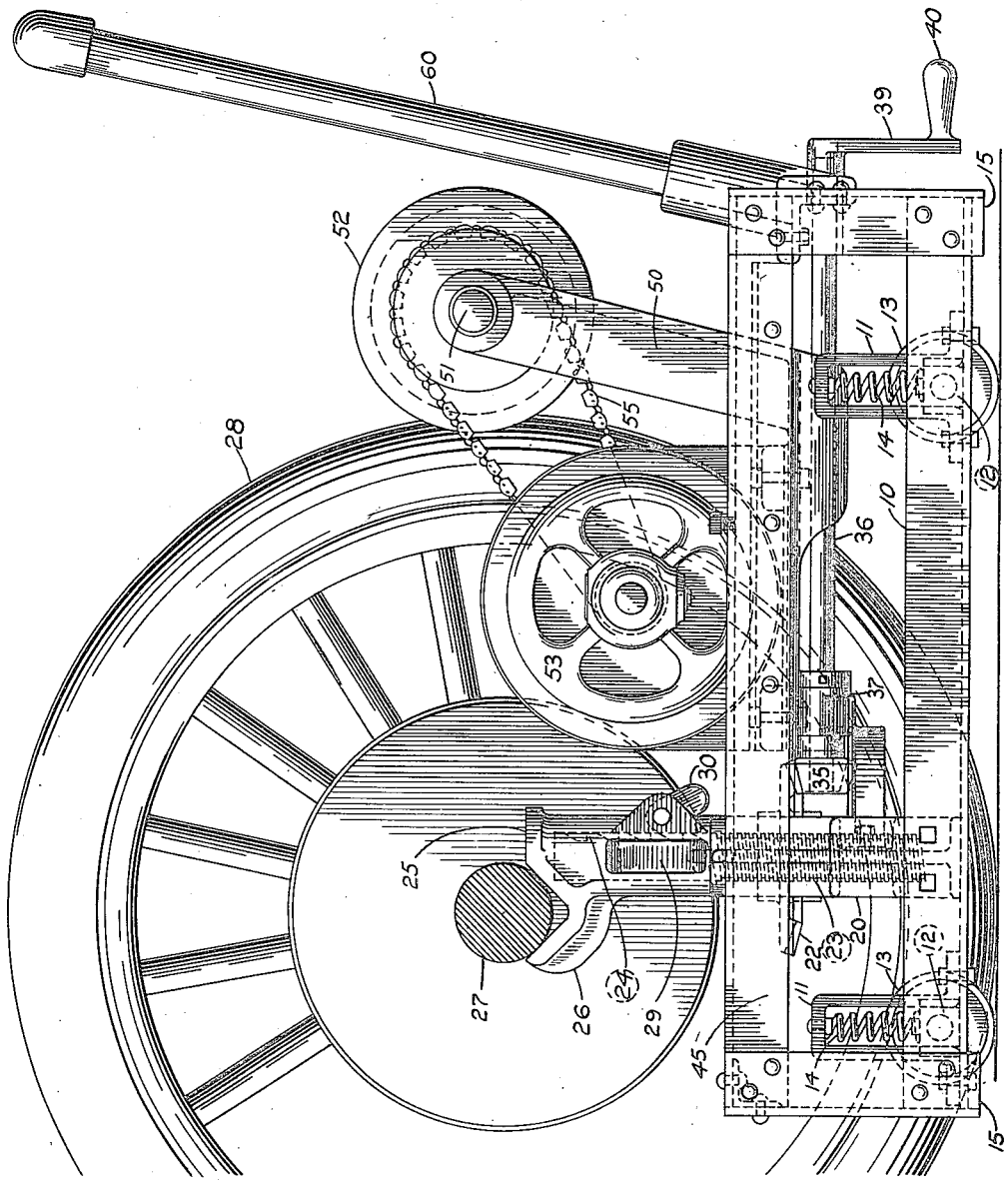
Figure 1 is a side elevation.
Figure 2:
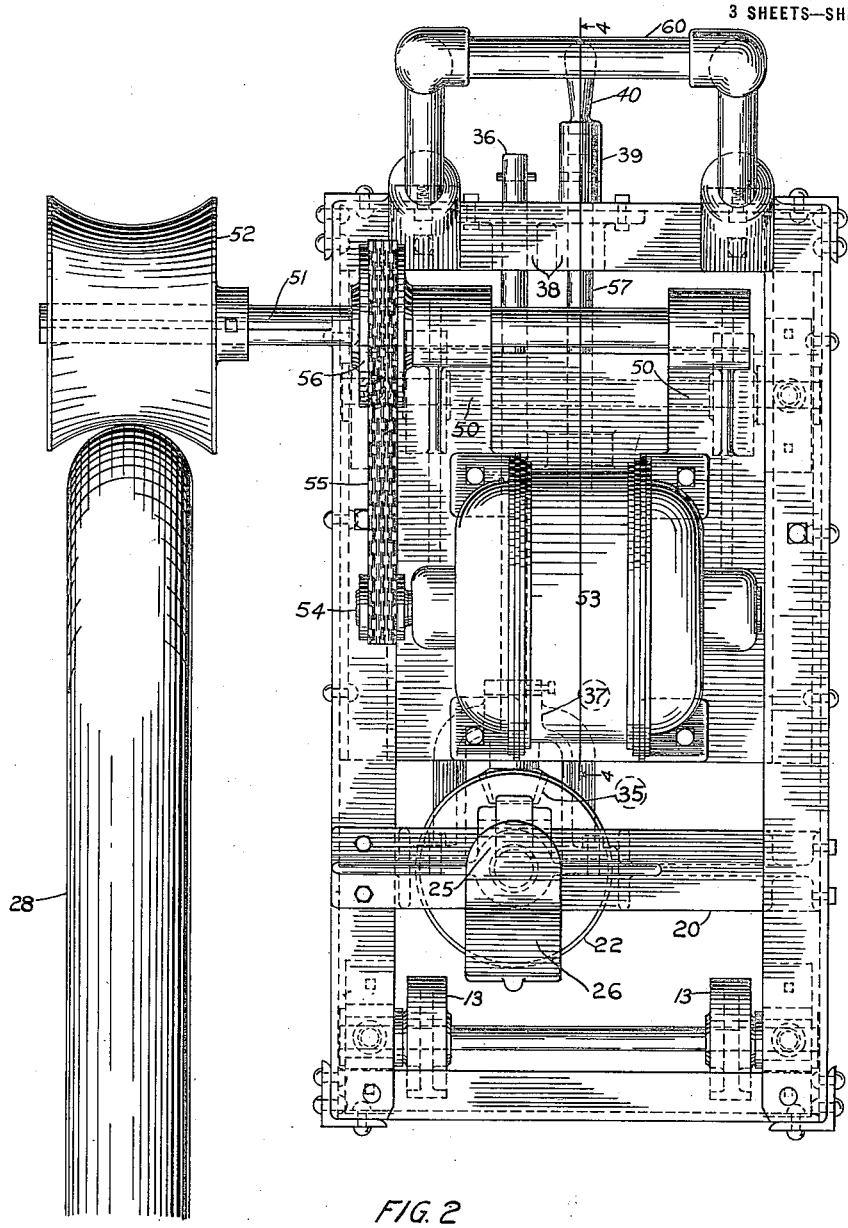
Fig. 2 is a plan view.

The structure in its entirety employs a framework which may be of generally rectangular formation having base rails 10 along each side, each rail carrying a pair of vertical guideways 11 adapted to receive in each a box 12 within which is journaled a wheel 13. A spring 14 is utilized, as shown in Fig. 1, to normally hold each wheel projected below the frame to provide wheeled supports therefor. When a load is carried, however, the frame is forced downwardly to present to the floor or ground corner abutments 15.

Near one end of the frame is a transverse wall 20 provided with an opening 21 within which is journaled a beveled gear wheel 22 whose axis is vertically disposed. This wheel has capacity for rotary movement only, and is interiorly threaded to move vertically a screw-threaded post 23 on whose upper end are formed a plurality of ratchet teeth 24. Slidably mounted on this post is a head 25 having a shoulder 26 which is adapted to underlie the rear axle 27 of a vehicle for the purpose of raising the same, its driving wheel 28 being thereby free to revolve. This head is shown to be provided with a handle 29 by which it may be moved relative to the post, and to have a jaw 30 in operative relation to the ratchet teeth 24 by which means the head may be maintained at any desired point upon the post. The head is adjustably mounted upon the post, so that its shoulder may be brought readily to engage the vehicle axle preliminary to the raising operation.

The post 23 derives vertical movement through a beveled gear 35 which is carried on the end of a shaft 36 suitably journaled in a lug 37 at one end, and at the other in a block 38 which is secured to the frame adjacent its rear end, this shaft extending beyond the frame where it is equipped with a crank 39 having an operating handle 40. By rotation of the crank the shaft 36 is turned to drive the gear 35 which is meshed with the wheel 22, the effect being to thereby elevate or lower the post 23, according to the direction of rotation. This construction provides a jack which is capable of lifting the rear axle of the vehicle to any desired height.

The framework of the present device is formed also with upper side rails 45, preferably in the form of angle irons so as to provide upper horizontal flanges 46 below each of which in spaced relation thereto is another flange 47 formed by the use of a second angle rail, all as best shown in Fig. 5. By this construction we have provided facing guideways within which may be received oppositely disposed tongues 48 that extend from a carriage 49 that is located centrally of the framework and adapted to be moved longitudinally thereof. Supported by this carriage are a pair of upwardly extending arms 50 providing bearings adapted to receive between them a shaft 51 which extends laterally to one side of the frame to carry on its end a friction wheel 52 adapted to engage with the tire or periphery of the vehicle wheel 28 from which power is to be taken. The carriage may further support a generator 53 having on its shaft a pulley or gear 54 from which a belt or chain connection 55 extends to a second pulley or gear 56 that is mounted on the shaft 51. The carriage, together with the parts supported thereon, may be moved longitudinally of the framework through the medium of a screw shaft 57 that engages with threads that are formed in a lug 59 which depends from the carriage. This shaft 57 is suitably journaled in the block 38 that is secured to the end of the framework and is equipped with a crank handle 39 by which it is manually operated. By rotating the screw shaft 57 through the medium of the handle 39 the carriage is moved toward or from the vehicle wheel 28 so as to present the friction wheel 52 thereto with a desired degree of pressure.

The operation of the present mechanism should be readily understood from the foregoing description, but may be briefly summed up as follows: The framework is moved upon its wheels 13 into operative position beneath the driven axle of the vehicle from which power is to be transmitted. To facilitate movements of the framework a handle 60 may be provided, as above. The head 25 is lifted to present the shoulder 26 immediately below the axle 27, following which the crank 39 is turned to rotate the gear wheel 22 so as to operate the jack. When the driven wheel 28 of the vehicle is raised sufficiently to revolve freely, the screw shaft 57 is then turned to advance the friction wheel 52 into firm contact with the tire or periphery of the wheel 28 so as to establish a driving connection therewith. With the parts in this relation, the vehicle power plant may be operated to drive the lifted wheel 28 from which power is transmitted through the friction wheel 52 to the generator 53 in the manner already described.

The exemplification of this invention that we have shown suggests its adaptability to the driving of a generator for supplying electric current for any desired purpose. It is obvious, of course, that the present construction may be utilized for the transference of power from the shaft 51 to other points by other desired means, so that we do not desire to be limited to a construction in which only an electrical apparatus is connected up to the remaining parts. Also in respect to other details of construction, it is obvious that certain changes or modifications are possible without sacrificing the features of advantage which are novel to this invention, and accordingly such changes are to be deemed as included within the scope of this patent as defined by the claims which follow.

We claim:

1. In association with a self-propelling vehicle, a power take-off mechanism embodying, in combination, a frame, a jack carried on the frame, means for operating the jack to raise one driving wheel of the vehicle, a carriage on the frame movable longitudinally of the vehicle, a shaft rotatably mounted on the carriage, a friction wheel carried by the shaft adapted to engage with a vehicle wheel to take off power therefrom, a rotatable device mounted on the carriage and having a driving connection with the rotatable shaft, and means for shifting the position of the carriage to properly adjust the friction wheel relative to the vehicle wheel, substantially as described.

2. In association with a self-propelling vehicle, a power take-off mechanism embodying, in combination, a frame adapted to be positioned beneath the rear axle of the vehicle, a jack having operating means therefor adapted to raise the vehicle axle, a friction wheel, a rotatable device carried by the frame having a driving connection with the friction wheel, and means for advancing the friction wheel toward and from the vehicle wheel without affecting the driving connection between itself and the device, substantially as described.

3. A power take off mechanism of the kind described including, in combination, a frame adapted for positioning beneath the rear axle of a self-propelled vehicle, yieldingly mounted wheel supports for the frame, means adapted to exert an upward pressure against the vehicle axle to thereby depress the frame to the ground, and means on the frame adapted to engage with a driven wheel of the vehicle to take off power therefrom, substantially as described.

VANE B. KORNER.
GUY R. TREVILLIAN.

Witness:
FRANCES M. FROST.